July 9, 1946.  C. R. MacCALLUM  2,403,812
ANTISKID TREAD
Filed May 7, 1942  3 Sheets-Sheet 1

Inventor
C. R. MacCallum
By Glascock Downing & Nichols
Attys

July 9, 1946.　　　C. R. MacCALLUM　　　2,403,812
ANTISKID TREAD
Filed May 7, 1942　　　3 Sheets-Sheet 2

Inventor
C. R. MacCallum

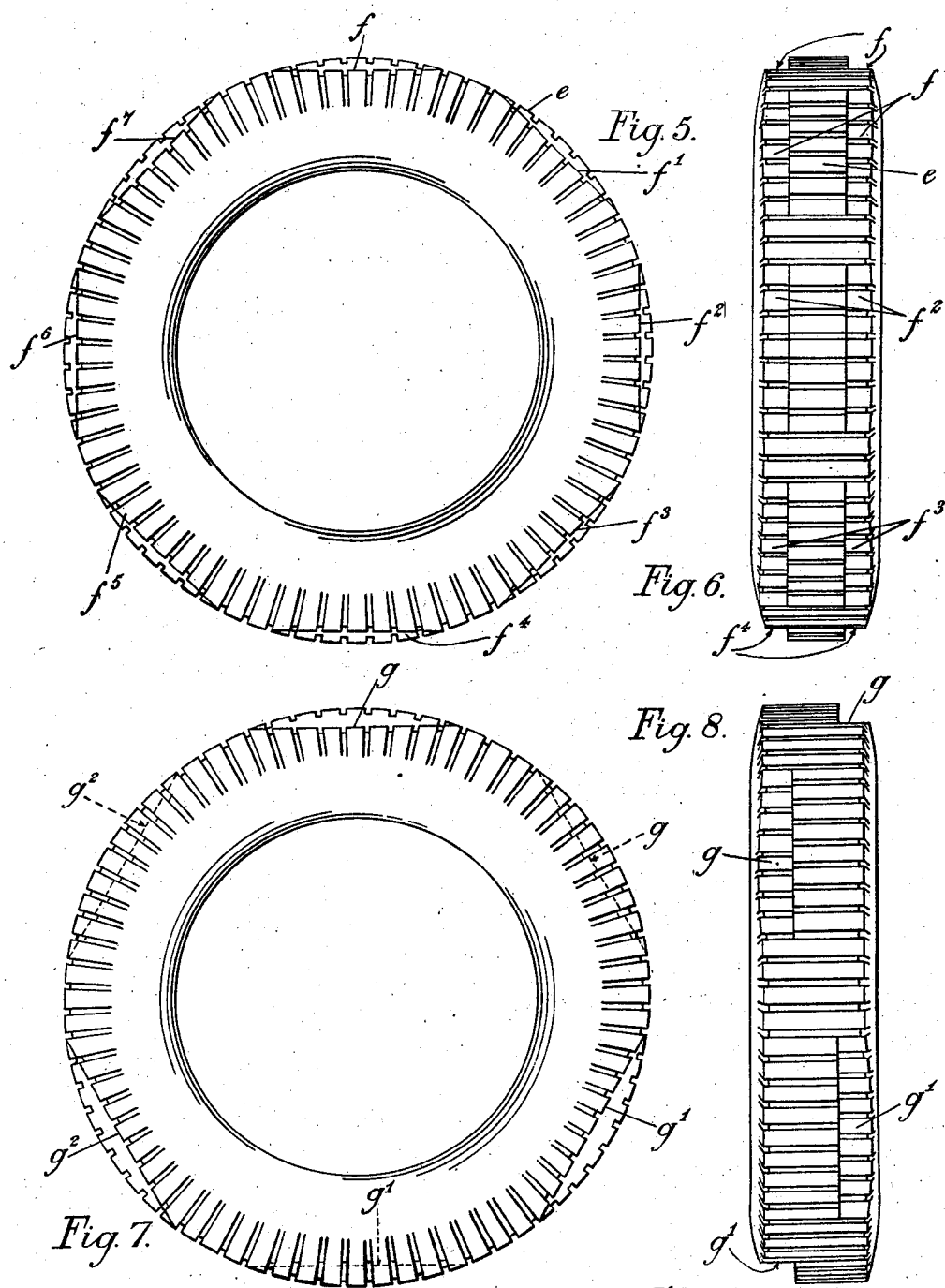

Patented July 9, 1946

2,403,812

UNITED STATES PATENT OFFICE 2,403,812

ANTISKID TREAD

Claude Ronald MacCallum, Glasgow C. 1, Scotland

Application May 7, 1942, Serial No. 442,089
In Great Britain March 14, 1940

8 Claims. (Cl. 152—209)

This invention has reference to wheels or to the tires or treads of the wheels of power driven vehicles and has for its object to provide improvements whereby the driven wheels of power driven vehicles will more effectively grip the ground or road surface when snow, mud, sand or the like is encountered, and which, when hard road surfaces are encountered, will run in a perfectly normal manner.

The invention is based on a principle which I employ in the construction and operation in use of vehicle wheel tires—pneumatic and otherwise—as described herein, and whatever form each type of these tires may take, if its construction and operation in use are based upon the principle or means hereinafter described, it will be typical as an example of the invention.

Assume that two or more, preferably thick, circular discs or the equivalent of same, or two or more concentric rings, each being of equal diameter and each having a section or sections of its periphery flattened (the number of flattened sections on each being equal to the number of rounded sections on same, and the rounded sections being, if so desired, greater in length than the flattened sections, the periphery as a whole being, if so desired, of any suitable degree or degrees of flexibility) are mounted coaxially side by side to rotate in unison. Also assume that their position in relation to each other is such that each flattened section of the periphery on one such disc is opposite to a rounded section of the periphery of its neighbouring disc, and that in the case of each pair of discs or the equivalent of same, the extreme edge of one flattened section of the one disc is parallel and directly opposite to and in line with an imaginary horizontal line drawn under the rounded section of its neighbouring disc, when said rounded section is the uppermost rounded section, said imaginary line indicating the depth to which the flattened section has been reduced from the circumferential line.

If a forward propelling force be now applied to cause the said discs (now analogous to a vehicle wheel) to rotate on an axle, there should be rotation and reaction in the usual way if same were applied to a hard surface, since a rounded section of one or more of the discs would always be in contact with the said surface. If, however, a soft surface be encountered, and if the discs had no flattened sections as hereinbefore described, there would be the usual greatly decreased surface resistance to rotation of the discs, but, having these constructed as hereinbefore described, a counter effect would at once take place, by the said yielding surface offering a much greater resistance to the rotation of the said flattened sections, which, due to the said rounded sections sinking into the soft surface, would then be contacting with the soft surface at angles which would effectively resist rotation. I may employ a flattened section or flattened sections on one disc, its neighbouring disc having no flattened sections and the relation of the flattened section or sections of the one to the unflattened periphery of the other in the matter of position and depth being as hereinbefore described. It is to be understood that the foregoing description has been herein explained for the purpose of making clear and setting on record the theory of the principle upon which the construction and operation in use of my invention are based. The peripheries of the discs are referred to as representing the peripheries of vehicle wheel tires.

The present invention has for its object to provide improvements in wheels, or in the tires or treads for wheels whereby under certain conditions they will more effectively grip the ground or road surface, which will not impart any vibration to the vehicle and which will not be subject to undue wear by reason of the improvements, whereby the aforesaid better gripping properties are attained.

Preferred embodiments of the invention are illustrated by the annexed drawings wherein:

Figures 1 and 2 each illustrate an elevation of one form of tire, which may be a solid or a pneumatic tire.

Figure 5 is an elevation of another construction of tire in accordance with the invention and Figure 6 is an end view thereof looking to the left.

Figure 7 is an elevation of a still further construction of tire in accordance with the invention and Figure 8 is an end view thereof looking to the right.

Figure 1:
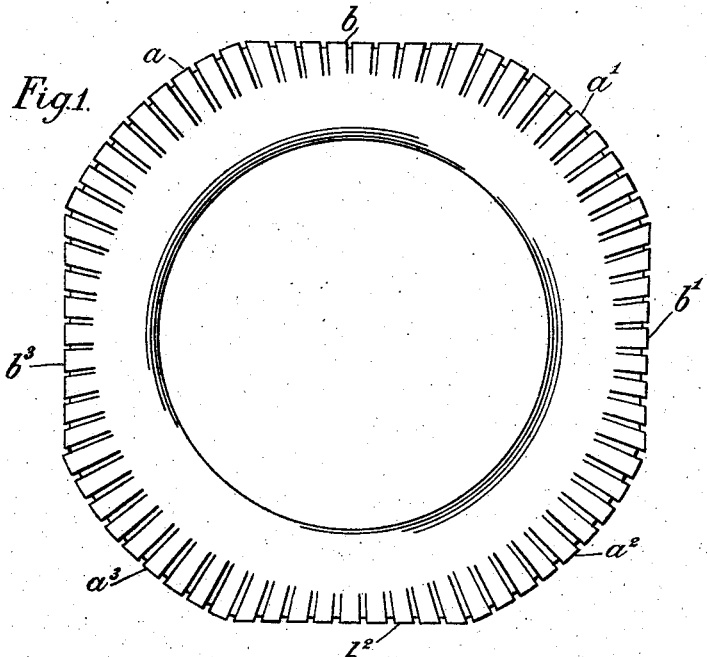

In the construction shown in Figures 1, 2, 3 and 4, the treads of the tires are formed by four rounded tread sections $a$, $a^1$, $a^2$ and $a^3$ and four flat tread sections, $b$, $b^1$, $b^2$ and $b^3$, said rounded sections alternating with the flat sections and together forming the complete periphery of the tire. The number of rounded and flat peripheral segments may be varied as found desirable. The flat and rounded sections may be of the same length, or the rounded sections may be longer than the flat sections. Each flat section extends at right angles to a line extending radially from the centre of the tire, or the centre of the wheel to which the tire is fitted and passing through the section midway between its ends.

The tread surface, i. e. both the flat and rounded sections, may be ribbed, grooved or otherwise formed, as is the common practice, to grip the road surface. In the drawings the tread surface is shown provided with transverse grooves.

Figure 2:
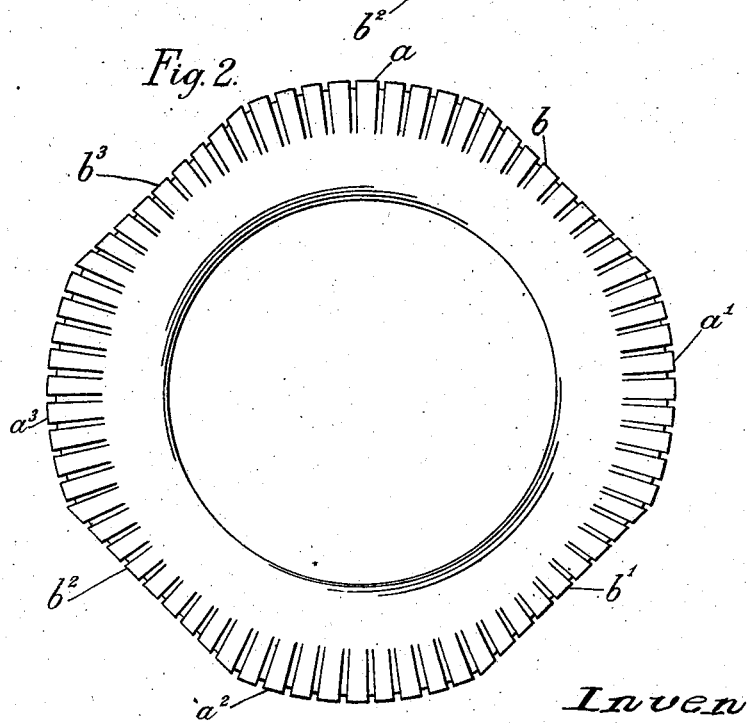
Figure 3:
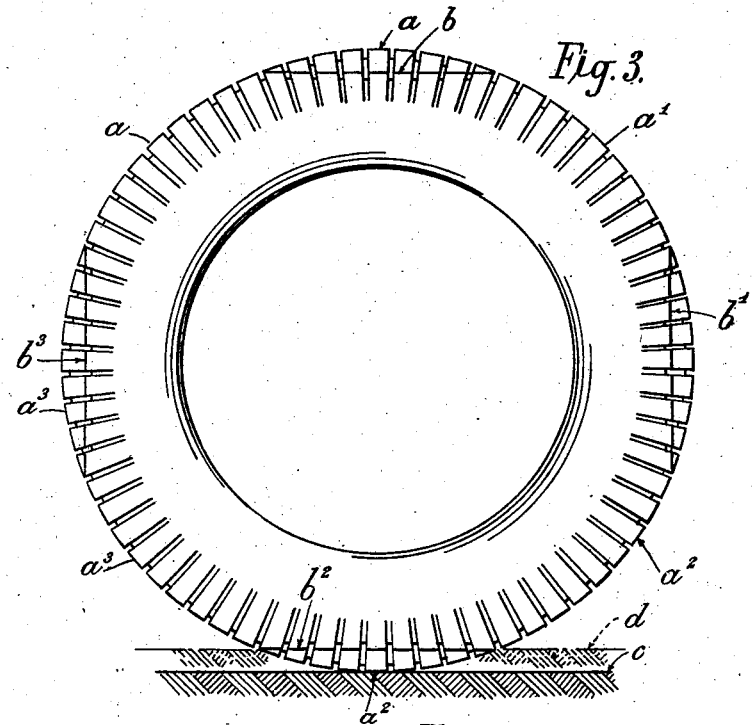
Figure 3 is an elevation of the two tires illustrated in Figures 1 and 2, the tires being shown in their juxtaposed positions which are the positions they would occupy when applied to a twin wheel
Figure 4:
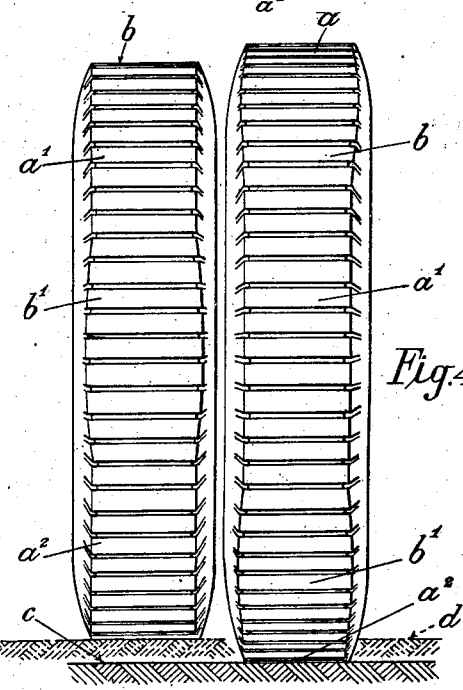
Figure 4 is an end elevation looking to the left of Figure 3.

Two wheels, each having a tire as illustrated in Figures 1 and 2, are mounted side by side on the same axle with the rounded sections, $a$, $a^1$, $a^2$ and $a^3$, of the one tire and the flat sections, $b$, $b^1$, $b^2$ and $b^3$ of the other juxtaposed as illustrated in Figures 3 and 4, the two wheels being secured to each other, or to the axle, in such manner that relative rotary movement is prevented.

A power driven vehicle is provided with a single pair, or two pairs, of driving wheels having such treads. When travelling over a good firm surface as indicated by the line C, Figures 3 and 4, the rounded portions of the two adjacent tires alternately take the load so that the wheels rotate with the smoothness of a wheel having a tire of the usual construction.

When a soft road, snow, mud or the like is encountered, as indicated by the dotted line, $d$ Figures 3 and 4, the wheels will sink sufficiently to permit the flat sections $b$, $b^1$, $b^2$ and $b^3$ to take the load in addition to the rounded sections so that in each pair of wheels a rounded and a flat surface simultaneously take the load. The flat sections, however, give a much better grip of the road surface, and therefore prevent or minimise slipping of the driven wheels.

Alternatively, a wheel having a tire provided with alternate flat and rounded tread sections extending round the periphery as above set forth may be used in combination with a wheel having a circular tread. When travelling over hard surfaces the circular tread of the one wheel and the rounded or part circular tread sections of the other take the load, but when travelling over soft ground the tread section of the first wheel sinks so that the load is taken, in parts by each flat section in turn. Such tread sections being flat will not slip so readily as treads which are circular and thereby more effectively grip the ground or the road surface.

More than two wheels having such tires or treads may be mounted co-axially side by side.

In the tire shown in Figures 5 and 6 the centre peripherally extending part $e$ forms a continuous circular tread. At each side of this centre part are flat tread sections, $f$, $f^1$, $f^2$, $f^3$, $f^4$, $f^5$, $f^6$ and $f^7$. Each of said flat sections lies at right angles to a line extending radially from the centre of the tire and passing through said section midway between its ends. Further each flat section is joined at its ends to curved sections forming extensions of the circular tread $e$.

When a power driven wheel having such tire is travelling over a hard surface the load is taken by the continuous circular tread $e$ but when travelling over soft ground, the circular tread $e$ sinks therein and the load is then taken by the circular tread and the flat tread sections $f$, $f^1$, $f^2$, $f^3$, $f^4$, $f^5$, $f^6$ and $f^7$, the latter preventing or reducing any tendency of the wheel to slip.

In the construction of tire shown in Figures 7 and 8 the tread of the tire towards each side thereof is formed with a series of flat tread sections $g$, $g^1$ and $g^2$, the flat tread sections on each side being spaced apart so that they are separated from each other by a rounded portion of the periphery of the tread. Further the flat sections on one side are staggered with respect to those on the other side. There is therefore a continuous circular tread surface which is never narrower than the breadth of the tread surface of the wheel less the breadth of one of the flat tread sections.

It will be noted that a part of the circular periphery of the tread extends between the ends of adjacent flat sections.

When a power driven wheel having such tread is travelling over hard ground the load is taken by the continuous circular tread and when travelling over soft ground the circular tread sinks therein so that the flat sections on both sides of the circular tread alternately also take the load to prevent or reduce slip.

I claim:

1. For a wheel, a tire having a peripheral tread embodying curved and flat sections, the curved sections conforming to parts of a circle the centre of which is the centre of the tire and the arcuate tread surface of the curved sections being at least equal in extent to that of the flat sections, while each flat section, which at its ends joins the adjacent curved sections, lies at right angles to a line extending radially from the centre of the tire and passing through such section midway between its ends.

2. A tire for a vehicle wheel having a tread formed of alternate curved and flat sections which have an arcuate extent at least equal to that of the flat sections, the curved sections extending the breadth of the tire and forming parts of a circular periphery, the centre of which is the centre of the tire, while each flat section, which at its ends joins the adjacent curved sections and extends the breadth of the tread, lies at right angles to a line running radially from the centre of the wheel and passing through such section midway between its ends, the construction being such that by combining a plurality of such tires in such manner that the curved sections of one are juxtaposed with the flat sections of another, the load, when travelling over hard ground, is continuously taken by the curved sections and when travelling over soft ground, snow, mud and the like the load is also taken by flat sections when prevent slip to a greater extent than can be done by the curved sections.

3. In a power driven vehicle a plurality of driven wheels mounted co-axially side by side, each wheel having a tire provided with a tread surface formed of alternate curved and flat sections which have an arcuate extent at least equal to that of the flat sections, the curved sections extending the breadth of the tire and forming parts of a circular periphery the centre of which is the centre of the tire, while each flat section, which at its ends joins the adjacent curved sections and extends the breadth of the tread, lies at right angles to a line extending radially from the centre of the wheel and passing through such section midway between its ends, the flat sections of one tire being juxtaposed with the curved sections of the adjacent wheel.

4. Twin or duplex driven wheels for power driven vehicles, said wheels being mounted co-axially side by side to rotate in unison, one of the wheels having a tread with circular periphery, while the tread of the other wheel is formed of alternate curved and flat sections, the curved sections extending the breadth of the tire and forming parts of a circular periphery the centre of which is the centre of the wheel, while each flat section, which at its ends joins the adjacent curved sections and extends the breadth of the tread, lies at right angles to a line extending radially from centre of the wheel and passing through such section midway between its ends, the arrangement and construction being such that when travelling on hard surfaces, the flat surfaces do not contact therewith, but when travelling over soft ground, snow, mud or the like, part of the load is taken by the flat surfaces due to the tread with circular periphery sinking in the soft surface, so that the flat surfaces will more effectively prevent slipping than can be done by a tread of circular periphery.

5. A vehicle tire having a tread formed, in part, by a continuous circular tread surface, and in part by alternate flat tread sections and curved tread sections, the curved sections forming part of a circular periphery while each flat section, which at its ends joins the adjacent curved sections, lies at right angles to a line extending radially from the centre of the tire and passing through such section midway between its ends.

6. A vehicle tire having a continuous centre circular tread, and flat sections located at each side of the circular tread, each flat section lying at right angles to a radial line extending from the centre of the tyre and passing through the section midway between its ends, and being interconnected by curved peripheral sections, said circular tread and curved sections taking the load when travelling over hard surfaces, and the flat tread sections taking the load, in part, when travelling over soft ground, snow, mud and the like and more effectively preventing slipping than can be done by the circular tread.

7. A vehicle tire having a continuous circular tread and flat sections located alternately on opposite sides of the circular tread, each flat section lying at right angles to a radial line extending from the centre of the tire and passing through the section midway between its ends, and being connected to each other by curved peripheral sections forming extensions of the circular tread, said circular tread and curved sections taking the load when travelling over hard surfaces and the flat tread sections taking the load, in part, when travelling over soft ground, snow, mud and the like and more effectively preventing slipping than can be done by the circular tread.

8. For a wheel a tire having curved peripheral sections and flat sections, each of which lies at right angles to a line extending radially from the centre of the tire and passing through such section midway between its ends, the two ends of each flat section intercepting the said curved peripheral sections.

CLAUDE RONALD MacCALLUM.